United States Patent
Umemoto et al.

(10) Patent No.: US 11,633,892 B2
(45) Date of Patent: Apr. 25, 2023

(54) METAL-RESIN BONDED MEMBER AND METHOD OF MANUFACTURING THE SAME

(71) Applicant: KABUSHIKI KAISHA TOYOTA CHUO KENKYUSHO, Nagakute (JP)

(72) Inventors: Kazuhiko Umemoto, Nagakute (JP); Hirotaka Okamoto, Nagakute (JP); Yuji Kaneko, Nagakute (JP); Shuxin Dong, Nagakute (JP); Yusuke Yagi, Nagakute (JP); Takeshi Uyama, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 269 days.

(21) Appl. No.: 15/746,961

(22) PCT Filed: Oct. 14, 2016

(86) PCT No.: PCT/JP2016/080483
§ 371 (c)(1),
(2) Date: Jan. 23, 2018

(87) PCT Pub. No.: WO2017/065256
PCT Pub. Date: Apr. 20, 2017

(65) Prior Publication Data
US 2018/0264696 A1    Sep. 20, 2018

(30) Foreign Application Priority Data

Oct. 14, 2015  (JP) .............................. JP2015-202590

(51) Int. Cl.
*B29C 45/14*    (2006.01)
*B29K 81/00*    (2006.01)
(Continued)

(52) U.S. Cl.
CPC .......... *B29C 45/14311* (2013.01); *B32B 7/10* (2013.01); *B32B 15/08* (2013.01);
(Continued)

(58) Field of Classification Search
CPC ....... B32B 15/08; B32B 15/18; B32B 27/286; B32B 2311/30; B29K 2081/04;
(Continued)

(56) References Cited

U.S. PATENT DOCUMENTS 2,756,169 A * 7/1956 Corson ............... B21B 45/0224
148/595
3,408,252 A * 10/1968 Manganello ............ B32B 27/00
428/469
(Continued)

FOREIGN PATENT DOCUMENTS

EP      2103407 A1 *  9/2009  ............. B32B 15/18
JP      S52-069487 A    6/1977
(Continued)

OTHER PUBLICATIONS

Marcius, Formation of Iron Oxides by Surface Oxidation of Iron Plate, 2012, Croatica Chemica ACTA 85 (1), pp. 117-124. (Year: 2012).*
(Continued)

*Primary Examiner* — Monique R Jackson
(74) *Attorney, Agent, or Firm* — Oliff PLC (57) ABSTRACT

An object is to provide a metal-resin bonded member that is easy to manufacture and has high bonding strength. The metal-resin bonded member includes a metal body having an iron oxide layer on the surface and a resin body bonded to the metal body via the iron oxide layer. The iron oxide layer has a thickness of 50 nm to 10 μm. The iron oxide layer comprises 60-40 at % Fe and 40-60 at % O at the outermost surface side. The iron oxide layer contains magnetite
(Continued)

($Fe_3O_4$). The iron oxide layer is formed by heating the surface of an iron-based substrate at 200-850° C. in an oxidation atmosphere. The resin body is composed of polyphenylene sulfide (PPS). The bonding of the metal body and the resin body via the iron oxide layer can be carried out by insert molding, thermal adhesion utilizing friction heating, etc.

11 Claims, 7 Drawing Sheets

(51) Int. Cl.
*B29K 705/12* (2006.01)
*B32B 15/08* (2006.01)
*B32B 15/18* (2006.01)
*B32B 27/28* (2006.01)
*B32B 7/10* (2006.01)
B29C 65/08 (2006.01)
B29C 65/82 (2006.01)
B29L 31/30 (2006.01)
B29C 65/00 (2006.01)

(52) U.S. Cl.
CPC ............ *B32B 15/18* (2013.01); *B32B 27/286* (2013.01); *B29C 65/08* (2013.01); *B29C 65/8253* (2013.01); *B29C 66/026* (2013.01); *B29C 66/30322* (2013.01); *B29C 66/71* (2013.01); *B29C 66/74283* (2013.01); *B29C 2045/14868* (2013.01); *B29K 2081/04* (2013.01); *B29K 2705/12* (2013.01); *B29L 2031/30* (2013.01); *B29L 2031/3076* (2013.01); *B32B 2250/02* (2013.01)

(58) Field of Classification Search
CPC ......... B29K 2705/12; C23C 8/10; C23C 8/14; C23C 8/18; C23C 2045/14868; C23C 2705/12; B29C 66/71; B29C 45/14311; B29C 66/026; B29C 2045/14868; B29C 66/74283; B29C 66/74273
See application file for complete search history.

(56) References Cited

U.S. PATENT DOCUMENTS

| | | | | |
|---|---|---|---|---|
| 3,783,035 A * | 1/1974 | Eisenlohr | ................. | C23C 8/18 428/425.8 |
| 4,384,657 A * | 5/1983 | Ueno | ..................... | B05D 7/14 138/171 |
| 4,425,383 A * | 1/1984 | Creatura | .............. | G03G 9/1075 148/284 |
| 4,496,401 A * | 1/1985 | Dawes | ................. | C21D 9/0068 148/217 |
| 4,810,590 A * | 3/1989 | Rich | ....................... | C08K 3/36 264/272.11 |
| 5,015,686 A * | 5/1991 | Kallenbach | .............. | C08K 3/22 524/413 |
| 8,852,707 B2 * | 10/2014 | Nishikawa | .......... | B29C 45/0001 264/279 |
| 2001/0036559 A1 * | 11/2001 | Haack | ................... | B29C 70/088 428/577 |
| 2004/0211214 A1 * | 10/2004 | Mabuchi | ............... | C23F 11/187 62/476 |
| 2006/0175381 A1 * | 8/2006 | Wang | ..................... | F16B 29/00 228/112.1 |
| 2010/0189958 A1 * | 7/2010 | Naritomi | .......... | B29C 45/14311 428/141 |
| 2011/0008644 A1 * | 1/2011 | Naritomi | .......... | B29C 45/14311 428/612 |
| 2011/0076505 A1 * | 3/2011 | Ishii | ....................... | C23C 22/82 428/472 |
| 2013/0242487 A1 * | 9/2013 | Fujioka | ............. | B29C 45/14811 361/679.01 |
| 2016/0341251 A1 * | 11/2016 | Yoshizuka | ................ | B22F 3/02 |

FOREIGN PATENT DOCUMENTS

| | | | |
|---|---|---|---|
| JP | S57-10374 A | 1/1982 | |
| JP | H04-225866 A | 8/1992 | |
| JP | 2009-292034 A | 12/2009 | |
| JP | 2011-168017 A | 9/2011 | |
| JP | 2014-208459 A | 11/2014 | |
| WO | WO-2015119231 A1 * | 8/2015 | ........... F16C 33/208 |
| WO | WO-2016147930 A1 * | 9/2016 | |

OTHER PUBLICATIONS

Chen, Review of the High-Temperature Oxidation of Iron and Carbon Steels in Air or Oxygen, Jun. 2003, Oxidation of Metals, vol. 59, Nos. 5/6, pp. 433-467. (Year: 2003).*
Sugama, Interfaces of polyphenylene sulphide-to-metal joints, Apr. 1991, International Journal of Adhesion and Adhesives, vol. 11, Issue 2, pp. 97-104, Abstract only. (Year: 1991).*
Sugama, Corrosion Protection of Steel and Bond Durability at Polyphenylene Sulfide-to-Anhydrous Zinc Phosphate Interfaces, 1992, Journal of Applied Polymer Science, vol. 15, pp. 1291-1301. (Year: 1992).*
Sugama, Interfaces of High-Protection Performance Polyaryls-Coated Zinc Phosphated Steels, Tri-Service Committee on Corrosion Proceedings, Jun. 1994, Tri-service Conference on Corrosion, Orlando Fl, uploaded to ResearchGate in Sep. 2015. (Year: 1994).*
Bertrand, Iron Oxidation at Low Temperature (260-500 C) in Air and the Effect of Water Vapor, 2009, Oxidation of Metals, vol. 73, No. 1-2, pp. 139-162. (Year: 2009).*
Machine translation of WO-2016147930-A1, published Sep. 2016, powered by EPO and Google. (Year: 2016).*
Jan. 10, 2017 Search Report issued in International Patent Application No. PCT/JP2016/080483.

* cited by examiner

METAL-RESIN BONDED MEMBER AND METHOD OF MANUFACTURING THE SAME

TECHNICAL FIELD

The present invention relates to a metal-resin bonded member obtained by bonding a metal and a resin and also to a method of manufacturing the same.

BACKGROUND ART

In recent years, highly-reliable bonded members of metals and resins have been required in accordance with lightweight needs etc. in the automotive field and aircraft field. Also in various electronic devices and power devices, they are packaged by being sealed with a resin, and bonding excellent in the high-temperature durability and the like is thus required between a metal such as housing and a sealing resin. Metal and resin are generally bonded using an adhesive, but the use of an adhesive may cause delamination and the like due to aged deterioration and therefore lack reliability. The use of an adhesive may not be preferred because it often involves the use of an adhesive solvent or the like which is an environmental load substance. Accordingly, there have been various proposals for bonding a metal and a resin without using an adhesive. For example, patent literature listed below includes relevant descriptions.

PRIOR ART LITERATURE

Patent Literature

[Patent Literature 1] JP2009-292034A
[Patent Literature 2] JP2011-168017A

SUMMARY OF INVENTION

Problems to be Solved by the Invention

Patent Literature 1 and Patent Literature 2 each describe a composite in which a stainless steel plate and a thermoplastic resin (such as PPS) are bonded by insert molding. In these proposals, the surface to be bonded of the stainless steel plate is chemically roughened prior to the bonding thereby to mechanically or physically bond the stainless steel sheet and the resin utilizing an anchor effect.

The present invention has been made under such circumstances and an object of the present invention is to provide a metal-resin bonded member that can exhibit high bonding strength and the like by a scheme different from the prior art. Another object of the present invention is to provide a method of manufacturing the same.

Means for Solving the Problems

As a result of intensive studies to achieve the above objects, the present inventors have found that a metal and a resin can be chemically bonded unlike the prior art. Developing this achievement, the present inventors have accomplished the present invention which will be described below.

«Metal-Resin Bonded Member»

(1) The metal-resin bonded member of the present invention is a metal-resin bonded member that comprises a metal body and a resin body. The metal body has an iron oxide layer formed on a surface of an iron-based base material composed of iron or iron alloy. The resin body is bonded to the metal body via the iron oxide layer. The iron oxide layer has a thickness of 50 nm to 10 μm. The iron oxide layer comprises 60-40 at % Fe and 40-60 at % O at least at an outermost surface side. The iron oxide layer contains at least magnetite ($Fe_3O_4$).

(2) In the metal-resin bonded member (simply referred to as a "bonded member") of the present invention, the metal body and the resin body are strongly bonded to each other via the iron oxide layer. The bonded member of the present invention can therefore be utilized for various members in various fields.

The bonded member of the present invention can exhibit high bonding strength even without depending on the physical bonding force such as an anchor effect of the prior art. From this fact, it is considered that some chemical bonding force is generated between the iron oxide layer and the resin body. Possible factors that cause chemical bonding force (chemical factors) include van der Waals' force, hydrogen bond, covalent bond, and ionic bond, but it appears that a strong bond such as a covalent bond is at least partially generated between the iron oxide layer and the resin body because the bonded member of the present invention exhibits high bonding strength. Although the mechanism of generating such a bond is not clear, it is inferred as below under present circumstances.

The iron oxide layer according to the present invention is a layer that has at least a thickness, component composition, and structure (texture) as described above rather than a layer that is simply and naturally formed on the surface of the metal body in the air atmosphere. It appears that such an iron oxide layer is in an electron-deficient state and in an active state with high energy. It is thus considered that the iron oxide layer formed on the surface of the metal body is chemically bonded to C, O, H, N, P, S, or the like existing in the vicinity of the surface to be bonded of the resin body and, consequently, the metal body and the resin body are strongly bonded to each other.

When at least the outermost surface of the iron oxide layer formed on the surface of the metal body has a fine irregular structure, an increase in the surface area (and accordingly the area of the bonding interface) due to the fine irregular structure can secondarily further enhance the bonding strength.

«Method of Manufacturing Metal-Resin Bonded Member»

(1) The present invention can be perceived not only as the bonded member but also as a method of manufacturing the same. That is, the present invention can be perceived as a method of manufacturing a metal-resin bonded member. The method comprises a bonding step of bonding a metal body and a resin body via an iron oxide layer. The iron oxide layer has a thickness of 50 nm to 10 μm. The iron oxide layer comprises 60-40 at % Fe and 40-60 at % O at least at an outermost surface side. The iron oxide layer contains at least magnetite ($Fe_3O_4$).

(2) The present invention can also be perceived as a method of manufacturing a metal-resin bonded member. The method comprises an oxidation step of forming an iron oxide layer on a surface of an iron-based base material composed of iron or iron alloy and a bonding step of bonding a metal body and a resin body via the iron oxide layer. The metal body has the iron-based base material at least at a side of a surface to be bonded. The oxidation step is a heating step of heating at least the surface of the iron-based base material in an oxidation atmosphere.

«Others»

(1) The phrase "containing at least magnetite ($Fe_3O_4$)" and similar phrases as referred to in the present description are enough if the iron oxide layer contains $Fe_3O_4$, and the ratio of the content of $Fe_3O_4$ and the content of other iron oxides (such as $Fe_2O_3$) in the iron oxide layer is not limited. In general, "red rust" composed of $Fe_2O_3$ has a very brittle property and it tends to be undesired for bonding as the content of $Fe_2O_3$ increases. It is therefore preferred that $Fe_2O_3$ be not substantially contained in the iron oxide layer or its content be small.

(2) Unless otherwise stated, a numerical range "x to y" as referred to in the present description includes the lower limit value x and the upper limit value y. Various numerical values or any numerical value included in numerical ranges described in the present description may be selected or extracted as a new lower limit value or upper limit value, and any numerical range such as "a to b" may thereby be newly provided using such a new lower limit value or upper limit value.

EMBODIMENTS FOR CARRYING OUT THE INVENTION

The contents described in the present description can be applied not only to the bonded member of the present invention but also to a method of manufacturing the same. One or more features freely selected from the present description can be added to the above-described features of the present invention. Features regarding a production process can also be features regarding the product. Which embodiment is the best or not is different in accordance with objectives, required performance, and other factors.

«Iron Oxide Layer»

(1) The iron oxide layer according to the present invention is primarily composed of Fe and O. At least at the outermost surface, the atomic percentage of Fe is preferably 60-40 at % in an embodiment, 55-40 at % in another embodiment, and 55-45 at % in still another embodiment while the atomic percentage of 0 is preferably 40-60 at % in an embodiment, 45-60 at % in another embodiment, and 45-55 at % in still another embodiment.

The composition of the outermost surface part of the iron oxide layer as referred to in the present description can be obtained through observing the cross section of the iron oxide layer using an electron probe microanalyzer (EPMA) and performing quantitative analysis. The amount of each element is calculated on the assumption that the overall composition within that range corresponds to 100 at %. The unit "at %" refers to an atomic ratio, which is a value calculated through multiplying the X-ray intensity ratio (k %) by the ZAF correction coefficient. In the case of Fe, for example, k % is the percentage indication of a value obtained through dividing the X-ray count number detected from a sample by the X-ray count number when measuring pure iron that is a standard sample for Fe. The ZAF correction coefficient is a value obtained for each of three items: the absorption effect; the atomic-number effect; and the fluorescence excitation effect on the behavior of the electron beam and the characteristic X-ray in the sample. Specifically, the amount of Fe and the amount of O measured and analyzed at three approximately equivalent locations in the depth direction (depth: 1 μm) within the range (1 μm×1 μm) are arithmetically averaged to obtain the composition (Fe and O) of the iron oxide layer according to the present invention.

The iron oxide layer can be composed of various iron oxides such as wustite (FeO), hematite (which is not limited to $Fe_2O_3/\alpha$-type and may be β-type, γ-type, ε-type or the like), and magnetite ($Fe_3O_4$). The iron oxide layer according to the present invention may be a mixture of one or more types of iron oxides and may contain an iron oxide in which O is partially deficient (defective). In an embodiment, the iron oxide layer may contain iron (ferrite) or iron alloy that is not an iron oxide. As described above, however, it is considered preferable that the iron oxide layer contains at least $Fe_3O_4$ and does not contain $Fe_2O_3$ as much as possible because in this case the high bonding strength is obtained (see Table 1 and FIG. 4A to FIG. 4 C).

The iron oxide layer is ordinarily formed on the surface of an iron-based base material composed of iron or iron alloy. In this case, the iron oxide layer may contain elements other than Fe and O in accordance with the composition and the like of the iron-based base material. The iron-based base material may be a metal body itself or may also be a material (such as iron plating) that is separately formed at the side of the surface to be bonded of a metal body composed of dissimilar metals having different compositions.

It suffices that the iron-based base material has a composition with which an iron oxide layer effective in enhancing the bonding strength is readily formed. The iron-based base material is not limited to pure iron and may also be an iron alloy such as carbon steel and alloy steel. Provided that the iron oxide layer to be bonded to the resin body is formed, the iron-based base material may be composed of stainless steel or the like.

It should be noted, however, that the characteristics (such as composition, structure, and texture) and formation conditions of the iron oxide layer effective in enhancing the bonding strength, etc., can vary depending on the component composition of the iron-based base material. In particular, the influence of the C content (content ratio) in the iron-based base material is considered to be large. Specifically, when the iron-based base material is pure iron, low-carbon steel or the like, an iron oxide layer effective in enhancing the bonding strength is readily formed under a wide oxidation condition. On the other hand, as the C content in the iron-based base material increases, the range of preferred oxidation conditions can be gradually narrowed.

In this regard, when the iron-based base material as a whole is 100 mass % (simply referred to as "%"), the C content is preferably 1% or less in an embodiment, 0.95% or less in another embodiment, 0.7% or less in still another embodiment, 0.5% or less in yet another embodiment, and 0.3% or less in a further embodiment.

(2) The iron oxide layer is a layer that is purposefully formed, rather than an oxide film or the like that is naturally formed in the air of an ordinary temperature. The thickness (layer thickness) of the iron oxide layer is preferably 50 nm to 10 μm in an embodiment, 80 nm to 6 μm in another embodiment, and 160 nm to 400 nm in still another embodiment.

If the thickness is unduly large, the iron oxide layer contains iron oxide such as hematite in addition to magnetite, and both the oxidation state and the structure of Fe become nonuniform, so that the delamination and/or the reduction in bonding strength may occur. If the thickness is unduly small, it is difficult to obtain sufficient bonding strength with the resin body. The thickness of the iron oxide layer as referred to in the present description is a distance from the outermost surface to the deepest part when the cross section of the iron oxide layer is observed using a scanning electron microscope (SEM).

When the range of the iron oxide layer from the outermost surface side to a depth of 1 μm is qualitatively analyzed using EPMA, the X-ray count number of the oxygen peak is preferably 1,500 to 13,000 cps in an embodiment, 2,000 to 12,000 cps in another embodiment, and 3,000 to 6,000 cps in still another embodiment because in such cases the bonding strength can be enhanced. The X-ray count number is obtained through analysis using a field emission electron probe microanalyzer (JXA-8500F, available from JEOL Ltd.) with an acceleration voltage of 15 kV, a beam current of 100 nA, and a beam diameter of 100 μmφ.

(3) The iron oxide layer according to the present invention can be formed by various methods such as heating using a heating furnace and/or laser irradiation. For example, the iron oxide layer may be simply and preferably formed through an oxidation process (oxidation step) for the surface of an iron-based base material composed of iron or an iron alloy existing at least at the side of the surface to be bonded of a metal body. The oxidation step can be performed, for example, as a heating step of heating at least the surface of the iron-based base material in an oxidation atmosphere (including the air atmosphere). The heating temperature is preferably 200-850° C. in an embodiment and 250-600° C. in another embodiment while the heating time is preferably 0.01-20 hours in an embodiment, 0.05-15 hours in another embodiment, and 0.1-10 hours in still another embodiment. In particular, the heating temperature is preferably 250-450° C. in an embodiment and 300-400° C. in another embodiment while the heating time is preferably 0.1-2 hours in an embodiment and 0.1-1.5 hours in another embodiment. Such adjustment of the heating temperature and heating time makes it possible to adjust the thickness, composition and the like of the iron oxide layer and, accordingly, the bonding strength can be adjusted in accordance with the resin body.

The heating condition is preferably adjusted, for example, in accordance with the C content in the iron-based base material. Specifically, when the C content is less than 0.25% in an embodiment, 0.2% or less in another embodiment, and 0.1% or less in still another embodiment with respect to 100% of the iron-based base material as a whole, the heating temperature is preferably 200-850° C. in an embodiment, 225-650° C. in another embodiment, and 250-450° C. in still another embodiment. The heating time is preferably 0.05-10 hours in an embodiment, 0.1-5 hours in another embodiment, and 0.1-2 hours in still another embodiment.

When the C content in the iron-based base material is 0.25% or more and less than 0.65% in an embodiment and 0.3% to 0.5% in another embodiment, the heating temperature is preferably 200-600° C. in an embodiment, 225-500° C. in another embodiment, and 250-400° C. in still another embodiment. The heating time is preferably 0.05-5 hours in an embodiment and 0.1-2 hours in another embodiment.

When the C content in the iron-based base material is 0.65% or more in an embodiment, 0.75% or more in another embodiment, 0.9% or more in still another embodiment, and 1% or more in yet another embodiment, the heating temperature is preferably 200-500° C. in an embodiment and 225-400° C. in another embodiment. The heating time is preferably 0.05-20 hours in an embodiment and 0.1-13 hours in another embodiment.

The iron oxide layer obtained through such an oxidation process is a modified layer of the surface of the iron-based base material (metal body) and is less likely to undergo easy delamination or the like from the iron-based base material (metal body), unlike a thin film or the like separately formed on the surface. The metal body and the resin body can therefore be more strongly and stably bonded via the iron oxide layer (modified layer) obtained through the oxidation process.

«Resin Body»

The resin body which is strongly bonded to the metal body via the iron oxide layer can be composed of various resins. Such a resin may be a thermoset resin or may also be a thermoplastic resin such as general-purpose plastic, general-purpose engineering plastic, and super engineering plastic. It suffices that, in the resin body, the resin to be bonded to the iron oxide layer exists at the surface part to be bonded (the iron oxide layer side), and the whole body may not necessarily have to be composed of the same type of resin.

Examples of the general-purpose plastic which is a thermoplastic resin include polyolefins such as polyethylene and polypropylene, polyvinyl chloride, polystyrene, acrylonitrile-butadiene-styrene copolymer, acrylonitrile-styrene copolymer, polymethyl methacrylate, polyvinyl alcohol, polyvinylidene chloride, polybutadiene, and polyethylene terephthalate. Examples of the general-purpose engineering plastic include polyamides such as nylon 6, nylon 66 and nylon 12, polyacetal, polycarbonate, modified polyphenylene ether, polybutylene terephthalate, and ultrahigh molecular weight polyethylene. Examples of the super engineering plastic include polysulfone, polyether sulfone, polyphenylene sulfide, polyarylate, polyamide imide, polyether imide, polyether ether ketone, thermoplastic polyimide, liquid crystal polymer, and fluorine resins such as polytetrafluoroethylene.

In particular, the resin body according to the present invention is preferably arranged such that, among the thermoplastic resins, polyamide such as nylon 6, nylon 66 and nylon 12 or polyphenylene sulfide (PPS) exists at least at the iron oxide layer side (at the side of the surface to be bonded).

Such a resin may be used alone or two or more types may be mixed. In addition, such a resin may be appropriately compounded with known fillers, known additives, known resin reinforcing materials, etc. The resin body may contain reinforcing fibers such as glass fiber and carbon fiber as a reinforcing material.

The resin according to the present invention may be compounded with various additives, provided that the effects of the present invention are not impaired. By compounding such additives, further improvement of the bonding strength, improvement of the leakage property at the resin-metal interface, further improvement of the interfacial adhesion, improvement of the long-term stability (such as heat resistance, moisture and heat resistance, and water resistance), etc. can be expected with various effects such as improvement of the elastic modulus of the resin (effects of inorganic fillers such as carbon fiber and glass fiber), polarity change (effects of rubber, elastomer, and other resins), deterioration suppression, and delayed decomposition reaction (effects of antioxidant and the like).

Such additives are not particularly restricted. Examples of the additives include flame retardant, antioxidant, hydrolysis inhibitor, light stabilizer, ultraviolet absorber, antistatic, glidant, release agent, crystal nucleating agent, viscosity modifier, colorant, pigment, antibacterial agent, surface treatment agents such as silane coupling agent, carbon-based nanofillers such as graphite, carbon nanofiber, carbon nanotube, carbon nanoplatelet, (single layer) graphene, multilayered (multilayer) graphene, nanographite (such as graphene nanoribbon), nanographene, carbon nanohorn, carbon nanocone, carbon nanocoil and fullerene, fibrous substances including synthetic fibers such as glass fiber, carbon fiber and aramid fiber and natural fibers such as cellulose, chitin and chitosan, and inorganic fillers including lamellar silicates such as isinglass (mica) mineral and kaolin mineral, calcium carbonate, calcium phosphate, titanium oxide, silica, whisker, alumina, boron nitride, aluminum nitride, silicon nitride, silicon carbide, diamond and zinc oxide. Excessive addition of such additives may cause deterioration of the impact strength. In an embodiment, organic-based additives such as rubber, elastomer, soft resin component and/or plasticizer may be added. However, excessive addition of organic additives may cause deterioration of the high-temperature rigidity ratio and reduction in the deflection temperature under load.

Types of such additives are not particularly limited, but preferred components are those with which the compatibility with resins does not significantly deteriorate or the compatibility is improved by chemical modification or addition of a compatibilizing agent even if the compatibility deteriorates. One type of such additives may be used alone or two or more types may be used in combination.

«Method of Manufacturing»

Various patterns may be considered as the step of bonding the metal body and the resin body. For example, the bonding step may include a supplying step of supplying the iron oxide layer with a softened or molten resin and a solidifying step of solidifying the resin to form the resin body. Specifically, the supplying step can be carried out such that a metal body having an iron oxide layer is accommodated or set in a mold and a softened or molten resin is injected into the mold so as to come into contact with the iron oxide layer. Such so-called insert molding can be efficiently carried out together with the bonding between the metal body and the resin body. The molding of the resin body may be carried out by any of injection molding, extrusion molding, blow molding, vacuum molding, transfer molding, compression molding and the like.

The bonding step may also be carried out by separately performing thermal adhesion of a resin body, which is formed into a desired shape, to a metal body. For example, the bonding step may include a heating step of heating a part to be bonded of the resin body and a cooling step of cooling the part to be bonded in a state in which the part to be bonded is brought into contact with (or pressed against) the iron oxide layer of the metal body. Due to the heating step, the part to be bonded of the resin body can be partially heated to be softened or melted and/or activated. The heating step can be carried out, for example, by applying ultrasonic vibration or the like to the part to be bonded of the resin body pressed against the iron oxide layer of the metal body so that friction heating occurs in the vicinity of the bonding interface.

«Bonded Member»

The bonded member of the present invention can be utilized for various products in various fields. In particular, the bonded member of the present invention does not depend on an adhesive or the like, the metal body and the resin body can be strongly bonded to each other, and therefore is suitable for components used in the automobile field, including structural components (materials) such as outer panels and interior and exterior parts and functional components (materials) that constitute units such as a control system and drive system. The bonded member of the present invention may also be preferably used in the architecture and civil engineering fields for fixation of a reinforcing material composed of a metal body and in the home electronics field for components, products and the like in which a resin body having a high degree of freedom in production and excellent designing properties is combined with a metal body having high strength.

EXAMPLES

Bonded bodies (materials under test) each obtained by integrally molding a resin and a metal formed with an iron oxide layer were manufactured, and the bonding strength of each bonded body was evaluated (Example 1). In addition, the iron oxide layers were analyzed from various aspects (Example 2). The present invention will be more specifically described through them.

Example 1

«Manufacturing of Samples»

(1) Iron-Based Base Material (Metal Body)

A plurality of iron-based substrates (10 mm×50 mm×t1 mm) was prepared as iron-based base materials, each comprising a material mainly differing in the C content: pure iron (purity: 99.99%); carbon steel (JIS S45C/C: 0.42-0.48%, Si: 0.15-0.35%, Mn: 0.6-0.9%, the balance: Fe); or tool steel (JIS SK5/C: 0.80-0.90%, Si: 0.1-0.35%, Mn: 0.10-0.5%, the balance: Fe). Compositions of the iron-based substrates were expressed simply as "%," with respect to 100 mass % as a whole.

The surface of each iron-based substrate was degreased with an organic solvent (acetone) and then heated in an electric furnace for an oxidation process (oxidation step). The heating atmosphere was an air atmosphere. The heating temperature was either 250° C., 350° C., 550° C., or 750° C. The heating time was either 0.1 hours (hr), 1 hour, or 10 hours.

(2) Resin Body

A molten resin (PPS) heated to 330° C. was injected into a mold in which each substrate was placed (supplying step). Thereafter, the mold was cooled to solidify the resin (solidifying step). Thus, a plurality of materials under test (metal-resin bonded members) was each manufactured by insert molding of the resin body to the iron-based substrate. The resin body was in a shape of 10 mm×40 mm×t2 mm, and the contact region (bonded part) with the iron-based substrate was in a shape of 10 mm×5 mm.

In addition, materials under test were also prepared as comparative examples through the same insert molding using various iron-based substrates without performing the above-described oxidation process. Samples or materials under test composed of such unoxidized iron-based substrates may be referred to as "BK."

«Bonding Strength»

The bonding strength of each material under test was measured as follows. A jig was pressed against the resin body to apply shearing force between the iron-based substrate and the resin body. The shearing force was measured when delamination occurred at the bonding interface or when the resin body was broken. The shearing force thus obtained was divided by the bonding area between the iron-based substrate and the resin body to obtain the bonding strength, which is listed in Table 1 and illustrated in FIG. 1A to FIG. 1C (these figures are collectively referred to as "FIG. 1" in a simple term) for each iron-based substrate. The heating temperature or heating time illustrated in each figure represents the oxidation process condition applied to each iron-based substrate.

«Evaluation»

(1) As apparent from Table 1, when using the unoxidized iron-based substrates, the bonding strengths of the metal-resin bonded members were all 0 MPa, and the iron-based substrates and the resins were not bonded at all.

Figure 1A:
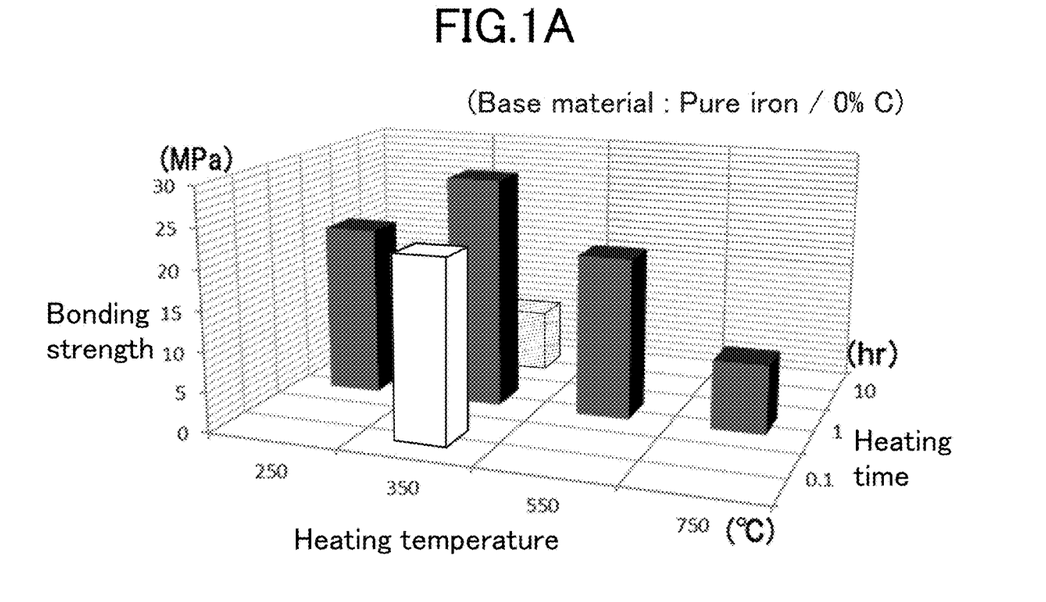
FIG. 1A is a bar graph illustrating the relationship between bonding strength between pure iron and resin and oxidation conditions for the pure iron.
Figure 1B:
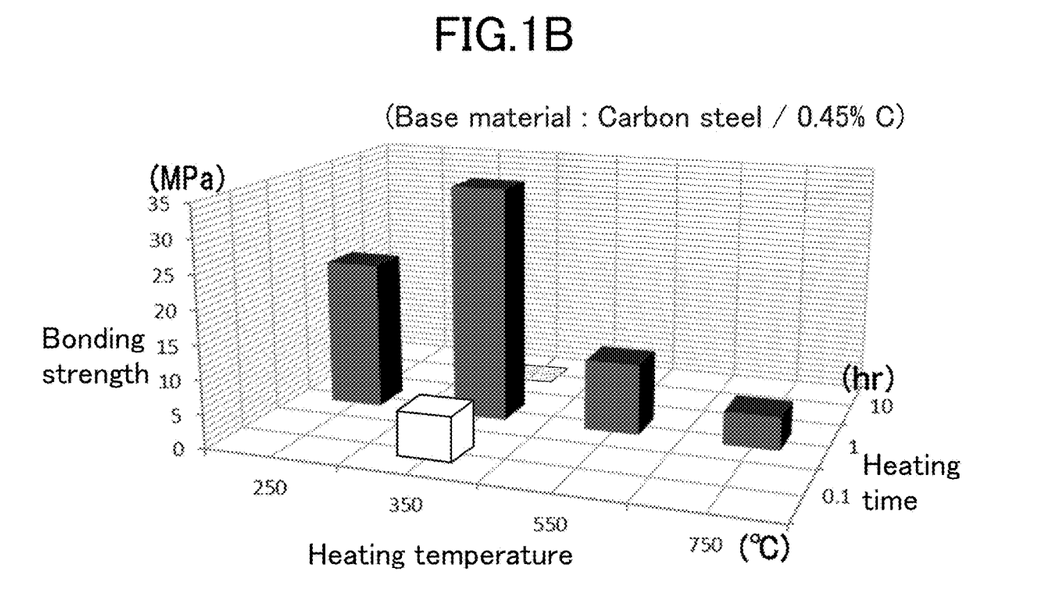
FIG. 1B is a bar graph illustrating the relationship between bonding strength between carbon steel and resin and oxidation conditions for the carbon steel.
Figure 1C:
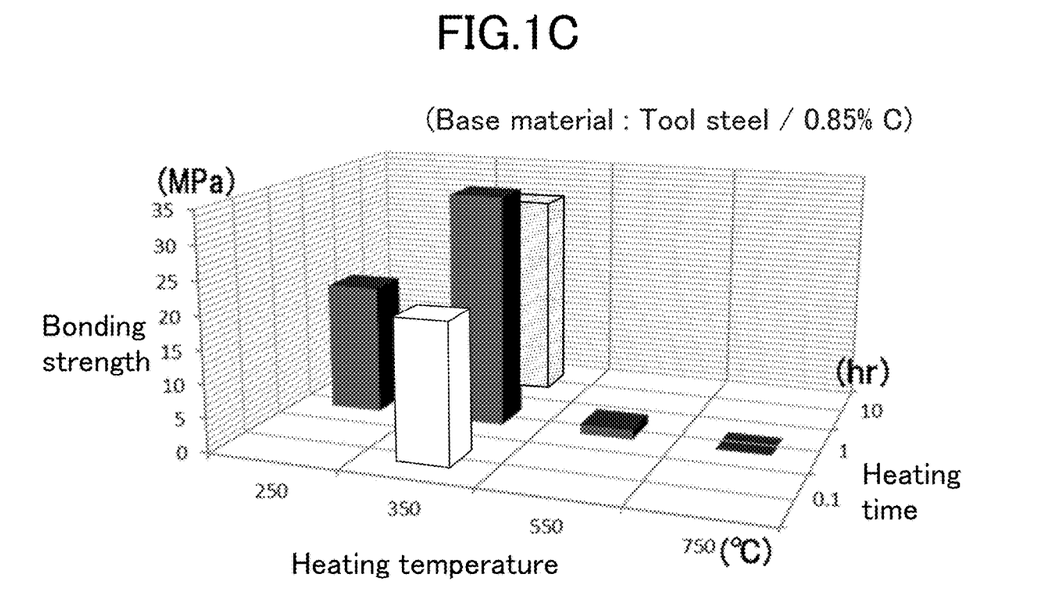
FIG. 1C is a bar graph illustrating the relationship between bonding strength between tool steel and resin and oxidation conditions for the tool steel.

(2) On the other hand, as apparent from Table 1 and FIG. 1, it has been found that sufficiently high bonding strength can be obtained when using the iron-based substrates which are subjected to an appropriate oxidation process. In particular, high bonding strength was obtained in any of cases of using the iron-based substrates subjected to heating (oxidation process) of 350° C.×1 hour, although slightly differing depending on the composition of the iron-based substrate. From these facts, it can be said that, irrespective of the type of the iron-based base material, the oxidation process conditions preferably include, for example, a heating temperature of 200-450° C. in an embodiment and 250-400° C. in another embodiment and a heating time of 0.05-5 hours in an embodiment and about 0.1-2 hours in another embodiment.

Example 2

With consideration for the above-described results, surface layers of the samples (iron-based base materials before bonding to resin bodies) obtained by subjecting various iron-based substrates to the oxidation processes under various conditions were observed or analyzed using SEM, EPMA, and XRD. The observation and analysis as in the above were also performed for samples (BK) composed of unoxidized iron-based base materials as comparative examples.

«SEM»

Figure 2:
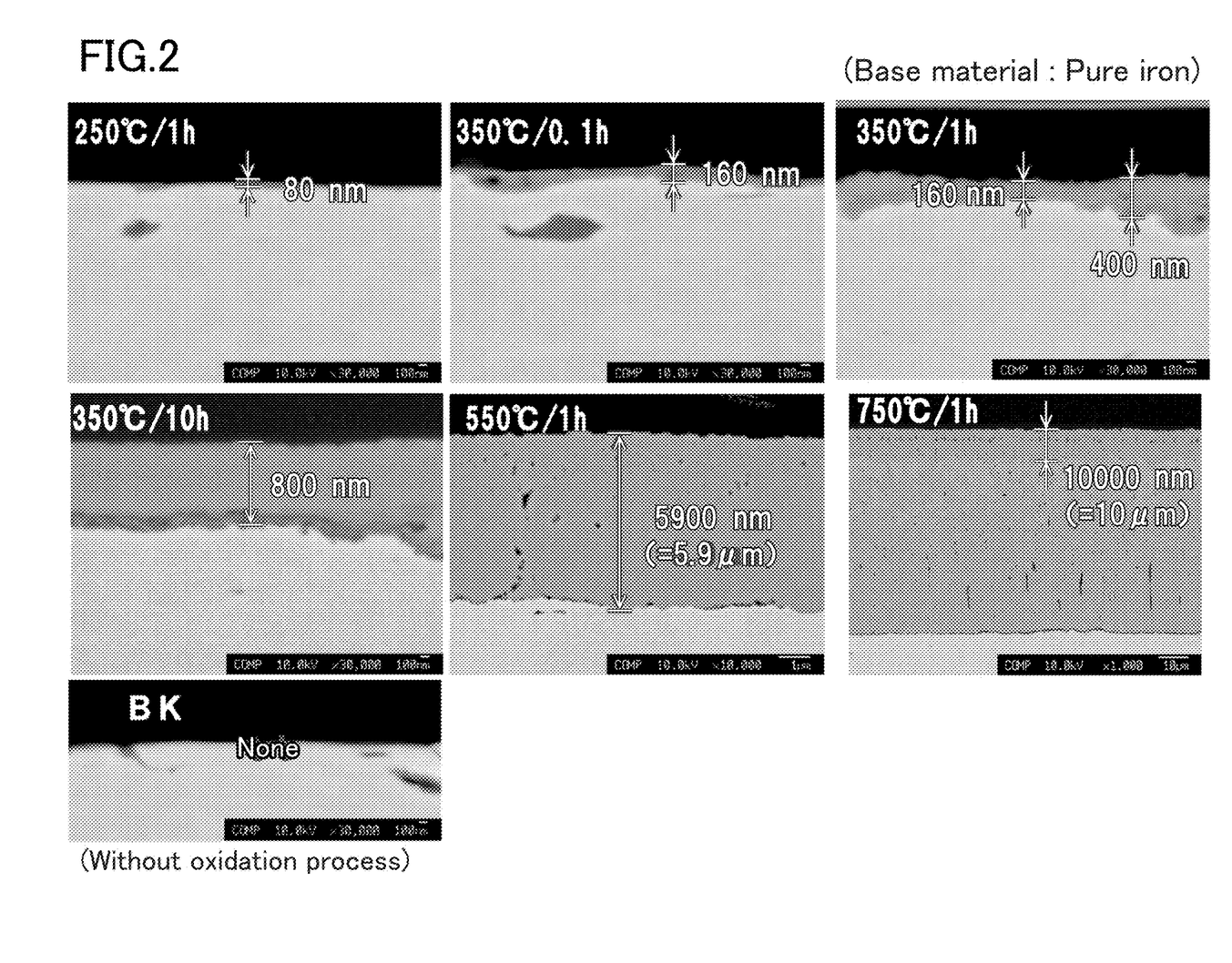
FIG. 2 is a set of scanning electron microscope (SEM) images obtained by observing surface layer parts of pure iron subjected to various oxidation processes.

FIG. 2 illustrates a set of SEM images relating to cross sections of the surface layer parts of respective samples using iron-based substrates composed of pure iron. The thickness of the iron oxide layer obtained from each SEM image is listed in Table 2. Table 2 also lists the presence or absence of $Fe_3O_4$ in the iron oxide layer obtained by analyzing each SEM image.

First, as apparent from FIG. 2 and Table 2, it has been confirmed that, when the oxidation processes are performed, the surface of each iron-based substrate is formed with a modified layer having a sufficient thickness, which is not observed in the case of not performing an oxidation process. It has also been found that the modified layer becomes thick as the heating temperature rises or the heating time increases. In particular, it has been found that the thickness drastically increases as the heating temperature rises. From the SEM image of the sample subjected to the oxidation process of 350° C.×1 hour, in which particularly high bonding strength is stably obtained, it can be said that the thickness of the modified layer is preferably 50-600 nm in an embodiment and about 100-500 nm in another embodiment.

Apparent from Tables 1 and 2, it has also been confirmed that magnetite ($Fe_3O_4$) is contained in the iron oxide layer of each sample in which certain bonding strength is obtained.

«EPMA»

Figure 3:
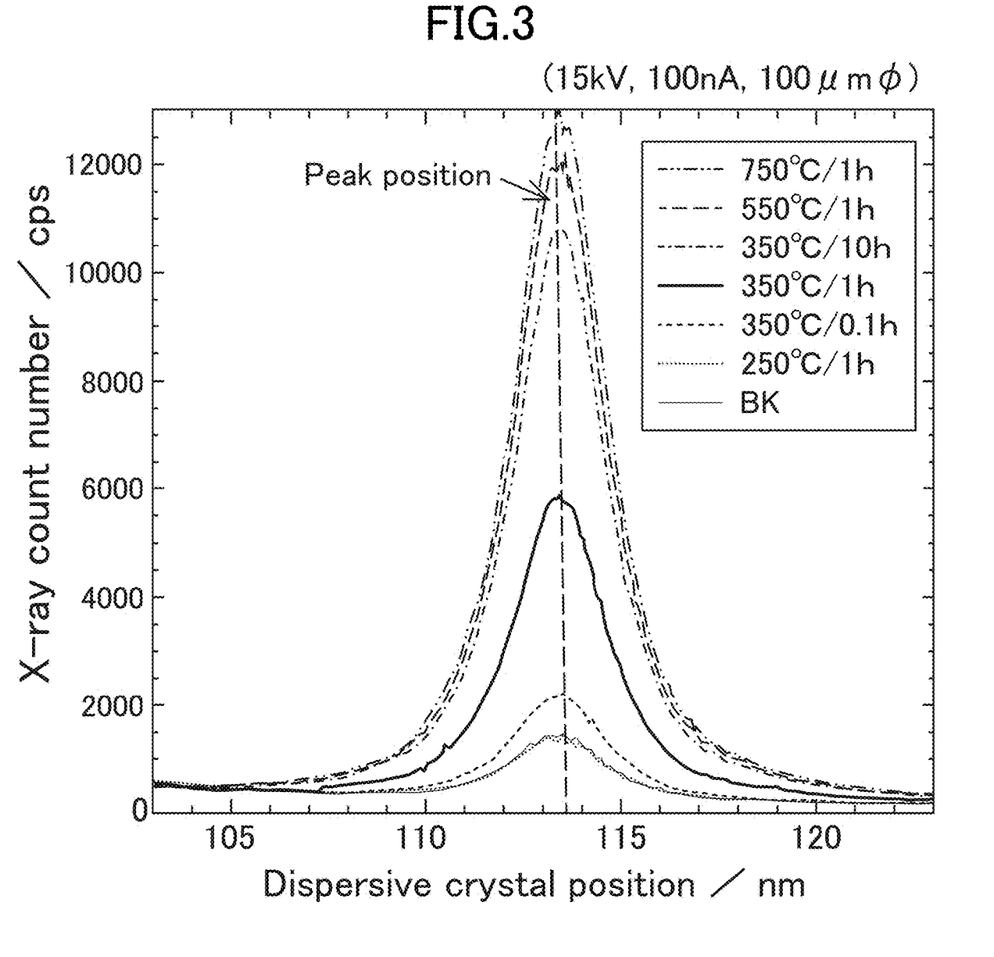
FIG. 3 is a graph illustrating X-ray count numbers of oxygen peaks obtained by analyzing surface layer parts of pure iron subjected to various oxidation processes using an electron probe microanalyzer (EPMA).

(1) FIG. 3 illustrates the X-ray count number of the oxygen peak obtained by EPMA for qualitatively analyzing the cross section of the surface layer part of each sample using an iron-based substrate composed of pure iron. From the result of the sample subjected to the oxidation process of 350° C.×1 hour, in which particularly high bonding strength is stably obtained, it can be said that the X-ray count number of the oxygen peak obtained by EPMA analysis of the modified layer is preferably 3,000-9,000 cps in an embodiment and about 4,000-8,000 cps in another embodiment.

(2) Table 2 lists atomic ratios (at %) of Fe and O obtained by EPMA for quantitatively analyzing the cross section of the surface layer part of each sample using an iron-based substrate composed of pure iron. From these results, it has been revealed that the modified layers are iron oxide layers formed by oxidation of surface parts of the iron-based substrates. In the iron oxide layer formed by the oxidation process of 350° C.×1 hour, in which particularly high bonding strength was stably obtained, the composition of the outermost layer side was Fe: 40-60 at % in an aspect and 41-55 at % in another aspect and O: 60-40 at % in an aspect and 59-45 at % in another aspect. As previously described, the composition of the modified layer refers to an average value calculated for a depth of 1 μm from the outermost surface.

It is considered that the iron oxide layer formed by the oxidation process of 350° C.×1 hour contains an iron oxide in which O is partially deficient (defective) because the Fe content is larger than the O content. The reason of formation of such an iron oxide appears to be that Fe existing at the substrate side (lower layer side of the iron oxide layer) affects the formation of the iron oxide because the thickness of the iron oxide layer is at most about 100 nm.

The iron oxide layer formed by the oxidation process of 350° C.×10 hour is estimated to be primarily magnetite from the atomic ratios of Fe and O. In comparison with this iron oxide layer, the heating temperature for the iron oxide layer formed by the oxidation process of 350° C.×1 hour is the same, but merely the heating time is short. From these facts, the iron oxide layer formed by the oxidation process of 350° C.×1 hour is also estimated to be magnetite in the course of growth.

On the other hand, the iron oxide layer formed by the oxidation process of 550° C.×1 hour or 750° C.×1 hour was liable to have a lower Fe content than the magnetite composition. From this tendency, it is considered that other oxides (such as hematite) than magnetite increased in these iron oxide layers. These considerations were derived with consideration for XRD analysis of the sample surfaces, which will be described below.

«XRD»

Figure 4A:
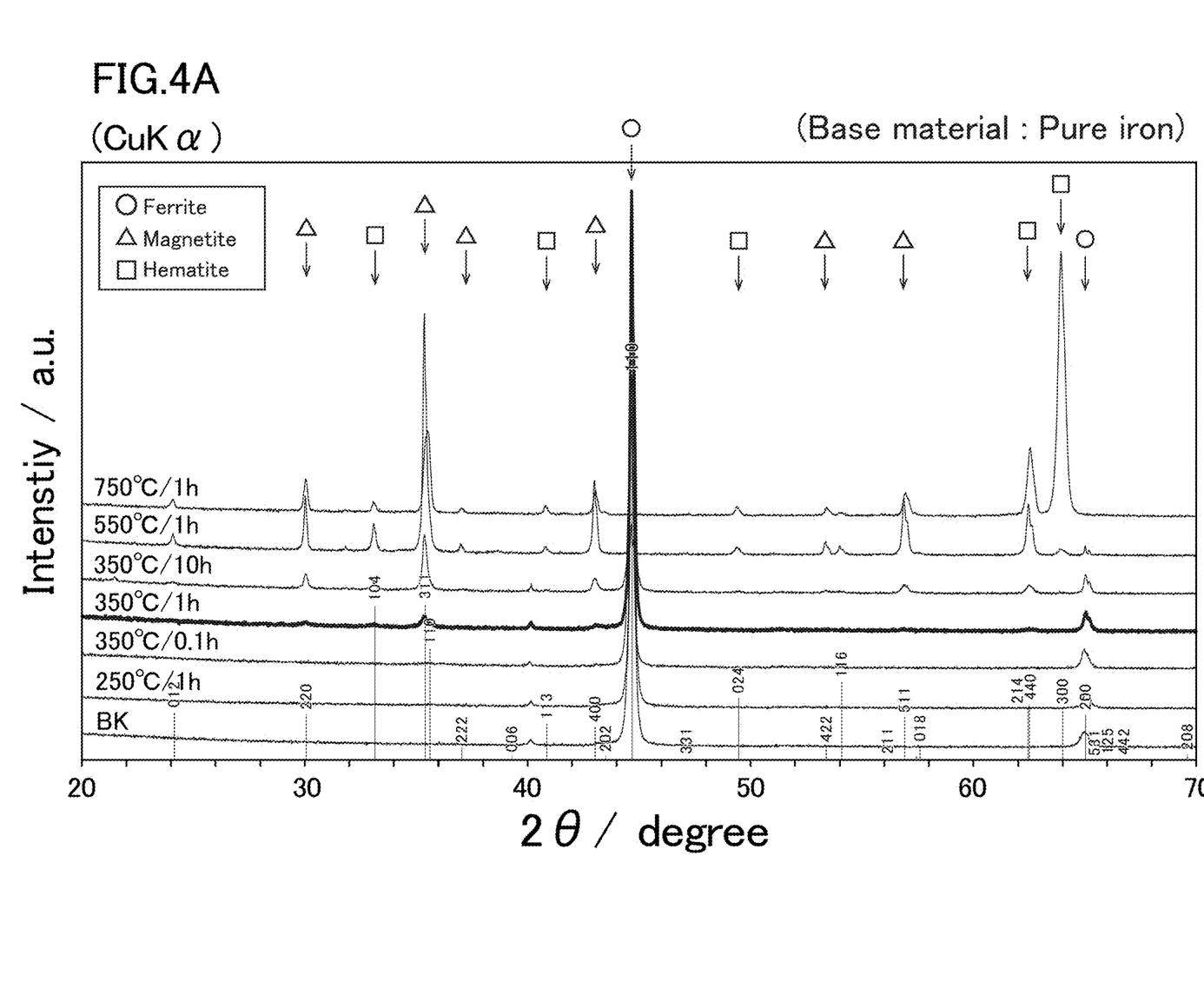
FIG. 4A is a set of X-ray diffraction (XRD) patterns of pure iron (BK) and iron oxide layers formed by oxidizing it under various conditions.
Figure 4B:
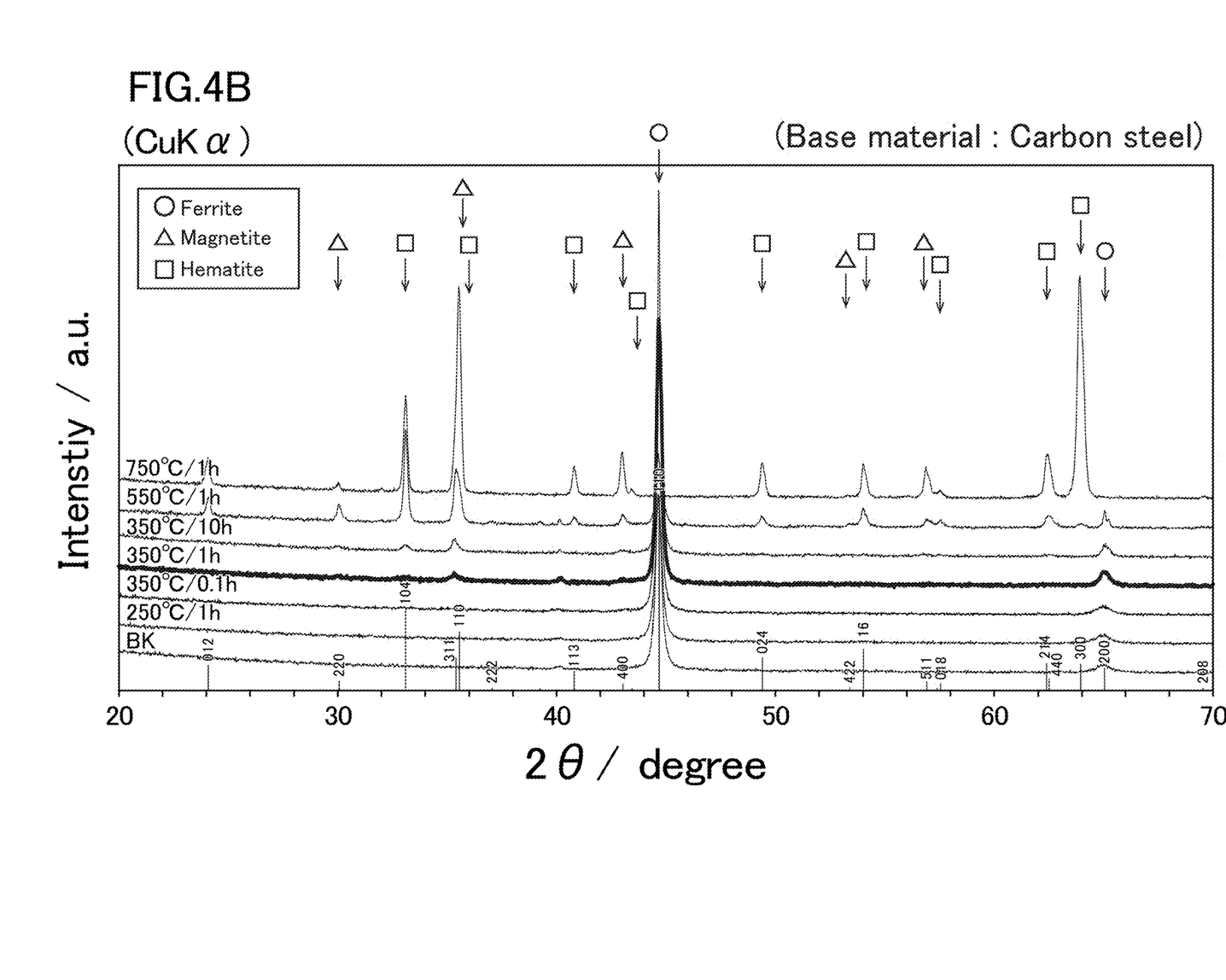
FIG. 4B is a set of XRD patterns of carbon steel (BK) and iron oxide layers formed by oxidizing it under various conditions.
Figure 4C:
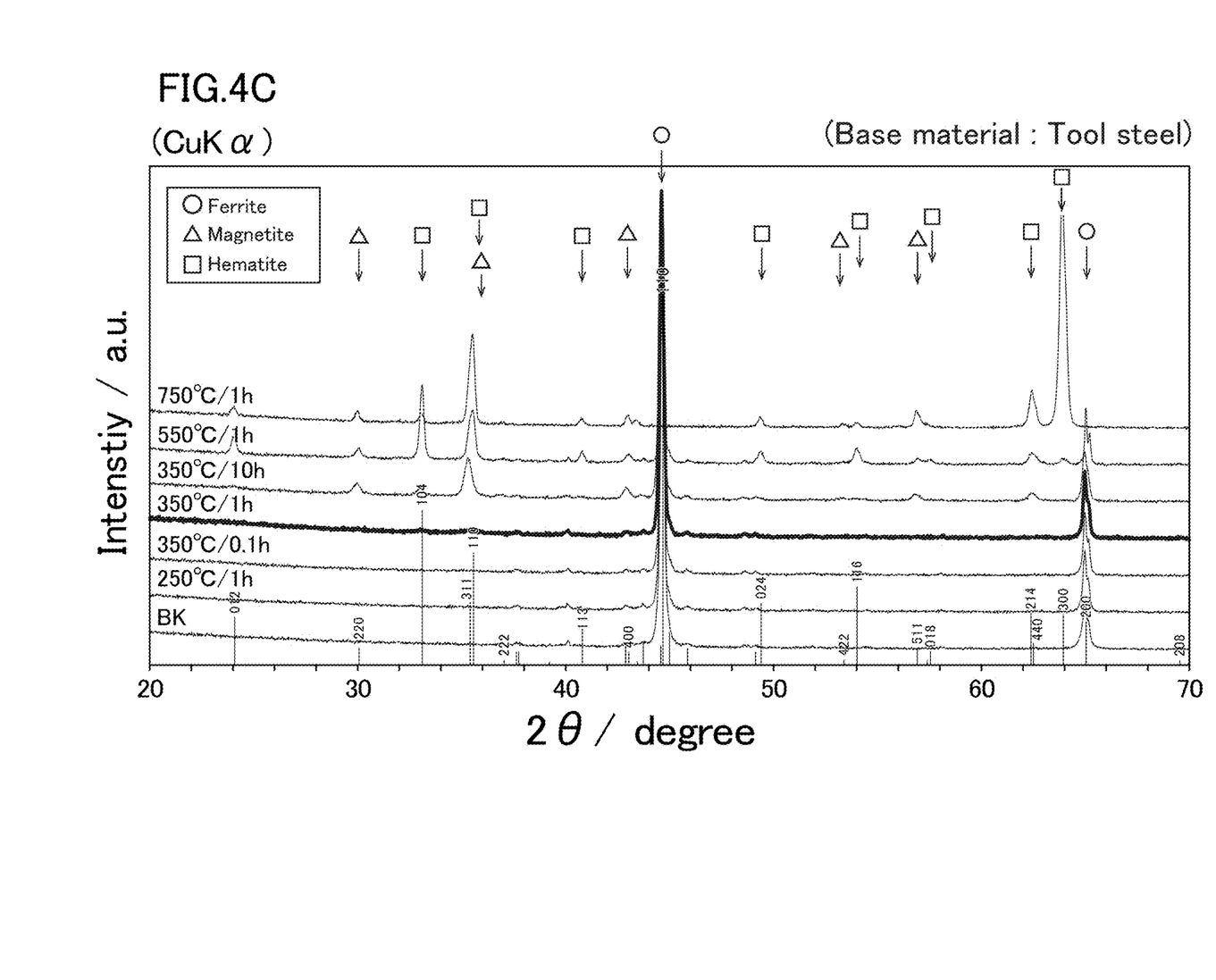
FIG. 4C is a set of XRD patterns of tool steel (BK) and iron oxide layers formed by oxidizing it under various conditions.

FIG. 4A to FIG. 4C (these figures are collectively referred to as "FIG. 4" in a simple term) illustrate X-ray diffraction patterns (CuKα line/wavelength λ=1.5418 Å) obtained by XRD analysis of the surface of the iron oxide layer of each sample (or BK). As apparent from the samples having high bonding strength (in particular, the sample subjected to the oxidation process of 350° C.×1 hour), it can be said that it is preferred for these iron oxide layers to contain at least magnetite and not much hematite and the like. The detection limit in the XRD measurement used at that time is about 1 mass %.

From the above, it has been confirmed that a metal-resin bonded member excellent in the bonding strength and reliability is obtained when the surface of a metal body is formed with an appropriate iron oxide layer and the metal body and a resin body are bonded to each other via the iron oxide layer.

TABLE 1

| | | Manufacturing conditions | | |
| | | Oxidation process | | |
| Sample No. | Iron-based base material | Heating temperature (° C.) | Heating time (hr) | Bonding strength (MPa) |
| --- | --- | --- | --- | --- |
| 11 | P | 250 | 1 | 21.2 |
| 12 | u | 350 | 0.1 | 22.7 |
| 13 | r | 350 | 1 | 28.7 |
| 14 | e | 350 | 10 | 7.8 |
| 15 | i | 550 | 1 | 20.1 |
| 16 | r | 750 | 1 | 8.7 |
| C1 | o n | BK | | 0 |
| 21 | C | 250 | 1 | 21.8 |
| 22 | a | 350 | 0.1 | 6.8 |
| 23 | r | 350 | 1 | 34.6 |
| 24 | b | 350 | 10 | 0 |
| 25 | o | 550 | 1 | 10.4 |
| 26 | n | 750 | 1 | 4.9 |
| C2 | s t e e l | BK | | 0 |
| 31 | T | 250 | 1 | 19.3 |
| 32 | o | 350 | 0.1 | 20.8 |
| 33 | o | 350 | 1 | 34.5 |
| 34 | l | 350 | 10 | 30.3 |
| 35 | s | 550 | 1 | 1.4 |
| 36 | t | 750 | 1 | 0 |
| C3 | e e l | BK | | 0 |

TABLE 2

| | Iron oxide layer | | | |
| | Composition at outermost surface side (at %) | | Thickness | Presence or absence |
| Sample No. | Fe | O | (nm) | of $Fe_3O_4$ |
| --- | --- | --- | --- | --- |
| 11 | — | — | 80 | Present |
| 12 | — | — | 160 | Present |
| 13 | 55.0 | 45.0 | 160~400 | Present |
| 14 | 42.6 | 57.4 | 800 | Present |
| 15 | 41.6 | 58.4 | 5900 | Present |
| 16 | 42.4 | 57.6 | 10000 | Present |
| C1 | — | — | 0 | Absent |

The invention claimed is:

1. A method of manufacturing a metal-resin bonded member, the method comprising
an oxidation step of forming an iron oxide layer on a surface of a metal body comprised of an iron-based base material composed of iron or iron alloy, a carbon content in the iron-based base material being 1 mass % or less based on 100 mass % of the iron-based base material as a whole, the formed iron oxide layer being in an electron-deficient state, the oxidation step comprising
heating at least the surface of the iron-based base material in an oxidation atmosphere at a heating temperature of from 300-350° C. for a time in a range of 0.1 to 2 hours, and
a bonding step of bonding the iron oxide layer of the metal body and a resin body, the bond comprising a chemical bond, the bonding step comprising
supplying the iron oxide layer with a softened or molten resin, and
solidifying the softened or molten resin to form the resin body,
the iron oxide layer having a thickness of 160 nm to 400 nm,
the iron oxide layer comprising 60-40 at % Fe and 40-60 at % O at least at an outermost surface side,
the iron oxide layer containing at least magnetite $Fe_3O_4$,
the resin body containing, at least at the iron oxide layer side, polyphenylene sulfide, wherein the resin body does not contain reinforcing fibers, and
the iron oxide layer being in an electron-deficient state prior to chemically bonding with the resin body.

2. The method of manufacturing a metal-resin bonded member as recited in claim 1, wherein
the supplying comprises bringing a part of the resin body to be bonded into contact with the iron oxide layer, and subsequently, heating the part of the resin body to obtain the softened or molten resin.

3. The method of manufacturing a metal-resin bonded member as recited in claim 1, wherein
the supplying comprises providing the metal body having the iron oxide layer on a surface thereof into a mold, and subsequently injecting the softened or molten resin into the mold so as to come into contact with the iron oxide layer.

4. The method of manufacturing a metal-resin bonded member as recited in claim 1, wherein
the chemical bond is a covalent bond.

5. The method of manufacturing a metal-resin bonded member as recited in claim 1, wherein
the heating is conducted for a time of from 0.1 to 1 hour.

6. A method of manufacturing a metal-resin bonded member, the method comprising
an oxidation step of forming an iron oxide layer on a surface of a metal body comprised of an iron-based base material composed of iron or iron alloy, a carbon content in the iron-based base material being 1 mass % or less based on 100 mass % of the iron-based base material as a whole, the formed iron oxide layer being in an electron-deficient state, the oxidation step comprising
heating at least the surface of the iron-based base material in an oxidation atmosphere at a heating temperature of from 300-350° C. for a time in a range of 0.1 to 2 hours, and
a bonding step of bonding the iron oxide layer of the metal body and a resin body, the bond comprising a chemical bond, the bonding step comprising
starting with a formed resin body having a shape, heating a part to be bonded of the formed resin body, bringing the heated part to be bonded into contact with the iron oxide layer of the metal body, and cooling the part to be bonded, the iron oxide layer having a thickness of 160 nm to 400 nm, the iron oxide layer comprising 60-40 at % Fe and 40-60 at % O at least at an outermost surface side, the iron oxide layer containing at least magnetite $Fe_3O_4$, the resin body containing, at least at the iron oxide layer side, polyphenylene sulfide, wherein the resin body does not contain reinforcing fibers, and the iron oxide layer being in an electron-deficient state prior to chemically bonding with the resin body.

7. The method of manufacturing a metal-resin bonded member as recited in claim 6, wherein the heating of at least the surface of the iron-based base material in the oxidation atmosphere is conducted for a time of from 0.1 to 1 hour.

8. The method of manufacturing a metal-resin bonded member as recited in claim 6, wherein the chemical bond is a covalent bond.

9. A method of manufacturing a metal-resin bonded member, the method comprising an oxidation step of forming an iron oxide layer on a surface of a metal body comprised of an iron-based base material composed of iron or iron alloy, a carbon content in the iron-based base material being 1 mass % or less based on 100 mass % of the iron-based base material as a whole, the formed iron oxide layer being in an electron-deficient state, the oxidation step comprising heating at least the surface of the iron-based base material in an oxidation atmosphere at a heating temperature of from 300-350° C. for a time in a range of 0.1 to 2 hours, and a bonding step of bonding the iron oxide layer of the metal body and a resin body, the bond comprising a chemical bond, the bonding step comprising supplying the iron oxide layer with a softened or molten resin, and solidifying the softened or molten resin to form the resin body, the iron oxide layer having a thickness of 160 nm to 400 nm, the iron oxide layer comprising 60-40 at % Fe and 40-60 at % O at least at an outermost surface side, the iron oxide layer containing at least magnetite $Fe_3O_4$, the resin body is made of, at least at the iron oxide layer side, polyphenylene sulfide, and the iron oxide layer being in an electron-deficient state prior to chemically bonding with the resin body.

10. The method of manufacturing a metal-resin bonded member as recited in claim 9, wherein the chemical bond is a covalent bond.

11. A method of manufacturing a metal-resin bonded member, the method comprising an oxidation step of forming an iron oxide layer on a surface of a metal body comprised of an iron-based base material composed of iron or iron alloy, a carbon content in the iron-based base material being 1 mass % or less based on 100 mass % of the iron-based base material as a whole, the formed iron oxide layer being in an electron-deficient state, the oxidation step comprising heating at least the surface of the iron-based base material in an oxidation atmosphere at a heating temperature of from 300-350° C. for a time in a range of 0.1 to 2 hours, and a bonding step of bonding the iron oxide layer of the metal body and a resin body, the iron oxide layer having a thickness of 160 nm to 400 nm, the iron oxide layer comprising 60-40 at % Fe and 40-60 at % O at least at an outermost surface side, the iron oxide layer containing at least magnetite $Fe_3O_4$, the resin body is made of, at least at the iron oxide layer side, polyphenylene sulfide, and the iron oxide layer being in an electron-deficient state prior to chemically bonding with the resin body.

\* \* \* \* \*